(12) United States Patent
Shimada et al.

(10) Patent No.: US 8,606,737 B2
(45) Date of Patent: Dec. 10, 2013

(54) RECORDING MEDIUM STORING DECISION TREE GENERATING PROGRAM, DECISION TREE GENERATING METHOD AND DECISION TREE GENERATING APPARATUS

(75) Inventors: Kuniaki Shimada, Kawasaki (JP); Yasuhide Matsumoto, Kawasaki (JP); Yukihiro Watanabe, Kawasaki (JP); Yuji Wada, Kawasaki (JP); Masazumi Matsubara, Kawasaki (JP); Kenji Morimoto, Bunkyo (JP); Hiroshi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 13/200,354

(22) Filed: Sep. 23, 2011

(65) Prior Publication Data

US 2012/0084236 A1    Apr. 5, 2012

Related U.S. Application Data

(63) Continuation of application No. PCT/JP2009/056488, filed on Mar. 30, 2009.

(51) Int. Cl.
*G06F 17/30* (2006.01)

(52) U.S. Cl.
USPC .......................................................... 706/46

(58) Field of Classification Search
USPC ................................ 706/12, 46, 50
See application file for complete search history.

(56) References Cited

U.S. PATENT DOCUMENTS

| 5,546,507 | A | * | 8/1996 | Staub .............................. 706/60 |
| 5,890,143 | A |   | 3/1999 | Sakurai |
| 6,704,719 | B1 | * | 3/2004 | Ericson ........................... 706/48 |
| 2001/0051934 | A1 |   | 12/2001 | Oyanagi et al. |
| 2003/0195890 | A1 | * | 10/2003 | Oommen ........................ 707/100 |
| 2006/0218169 | A1 | * | 9/2006 | Steinberg et al. ............. 707/101 |

FOREIGN PATENT DOCUMENTS

| EP | 0359395 B1 | 3/1990 |
| JP | 2-50223 | 2/1990 |
| JP | 6-139073 | 5/1994 |
| JP | 09-204310 | 8/1997 |
| JP | 9-330224 | 12/1997 |
| JP | 2001-282817 | 10/2001 |
| JP | 2005-339529 | 12/2005 |

OTHER PUBLICATIONS

International Search Report mailed May 19, 2009 issued in corresponding International Patent Application No. PCT/JP2009/056488.

(Continued)

*Primary Examiner* — Kakali Chaki
*Assistant Examiner* — Michael Zidanic
(74) *Attorney, Agent, or Firm* — Staas & Halsey LLP

(57) ABSTRACT

A constraint condition DB storing a constraint condition that stipulates a structure of a decision tree is referenced, and a decision tree is generated from a case set where values of a plurality of attributes and a conclusion are associated with one another so that the structure of the decision tree, which is stipulated by the constraint condition, is satisfied. Accordingly, for example, even if a new case is added to the case set, a basic structure of the decision tree is succeeded by the constraint condition, thereby avoiding a situation where an operator needs to significantly modify the decision tree. Therefore, operations of modifying the decision tree by the operator can be reduced.

5 Claims, 16 Drawing Sheets

(56) References Cited

OTHER PUBLICATIONS

International Preliminary Report on Patentability issued Nov. 15, 2011 in corresponding International Patent Application No. PCT/JP2009/056488.

J.R. Quinlan, "Induction of Decision Trees", Machine Learning, vol. 1, 1986, pp. 81-106.

Rei Yano et al., "Decision Tree Learning with Causal Information among Attributes", The Japan Society for Artificial Intelligence, vol. 12, 1998, pp. 17-18.

International Search Report for PCT/JP2009/056488, mailed May 19, 2009.

Japanese Office Action mailed Feb. 12, 2013 in corresponding Japanese Patent Application No. 2011-508093.

Isamu Shioya et al., "Knowledge Discovery of Decision Trees by Relaxing Domain Knowledge", 2003, pp. 1-5.

Japanese Office Action dated Feb. 12, 2013, issued in corresponding Japanese Patent Application No. 2011-508093.

* cited by examiner

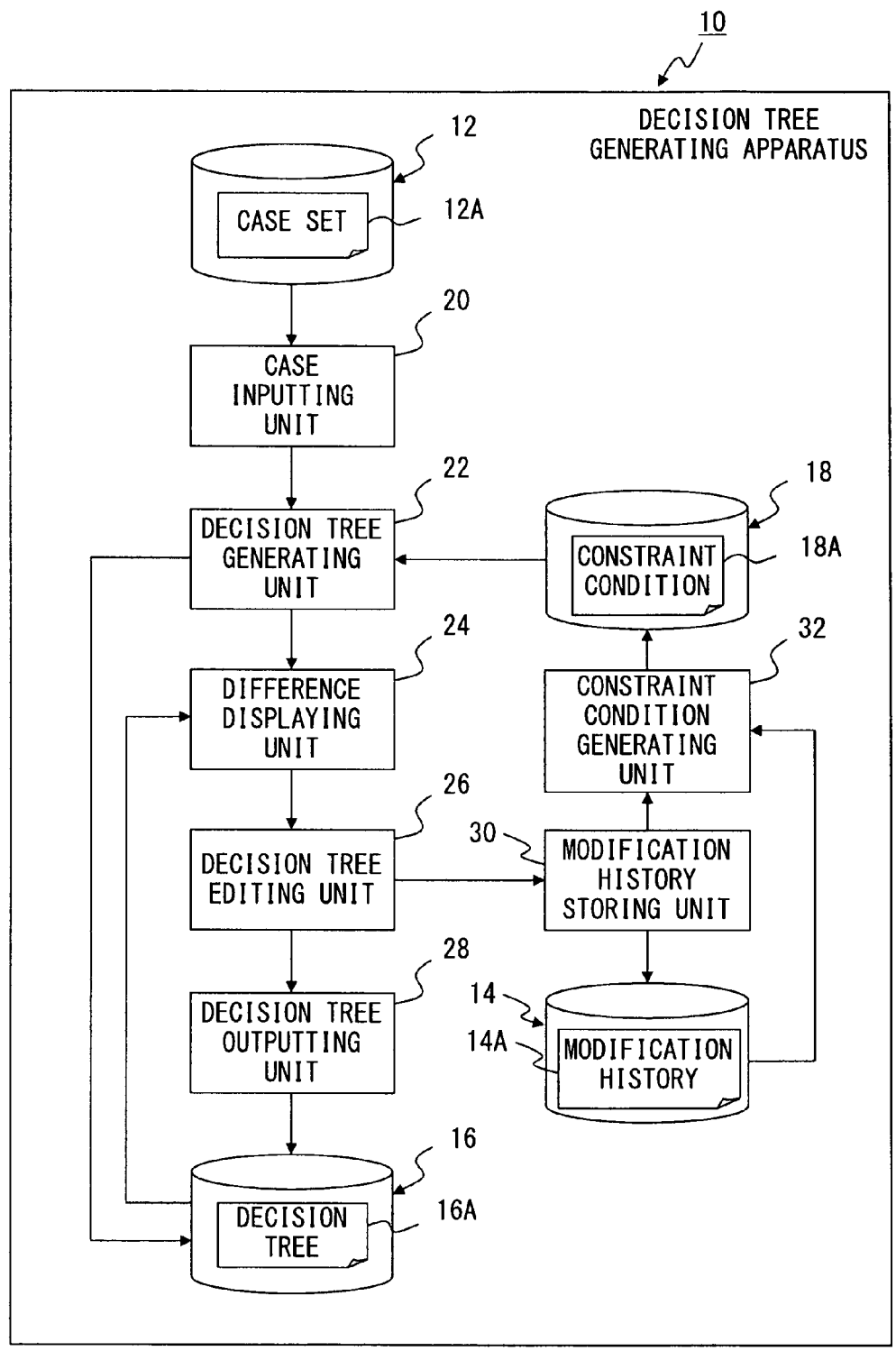
F I G. 1

| | DELAYED PROCESS ($a_1$) | DELAYED TIME ($a_2$) | INFLUENCE BY HEAVY/LIGHT LOAD ($a_3$) | CAUSE ($a_4$) |
|---|---|---|---|---|
| CASE 1 ($C_1$) | ONLINE BATCH | STARTING AT BEGINNING OF OPERATIONS | SLOW BY ITSELF | DELAY BY VIRUS SCAN |
| CASE 2 ($C_2$) | ONLINE | STARTING AT PARTICULAR TIME | SLOW BY ITSELF | CPU LOAD IMPOSED BY INCREASE IN AMOUNT OF LABOR |
| CASE 3 ($C_3$) | ONLINE BATCH | STARTING AT BEGINNING OF OPERATIONS | FAST BY ITSELF | RESPONSE DELAY BY LARGE LOG OUTPUT |
| CASE 4 ($C_4$) | ONLINE BATCH | STARTING AT BEGINNING OF OPERATIONS | SLOW BY ITSELF | DELAY BY VIRUS SCAN |

FIG. 2

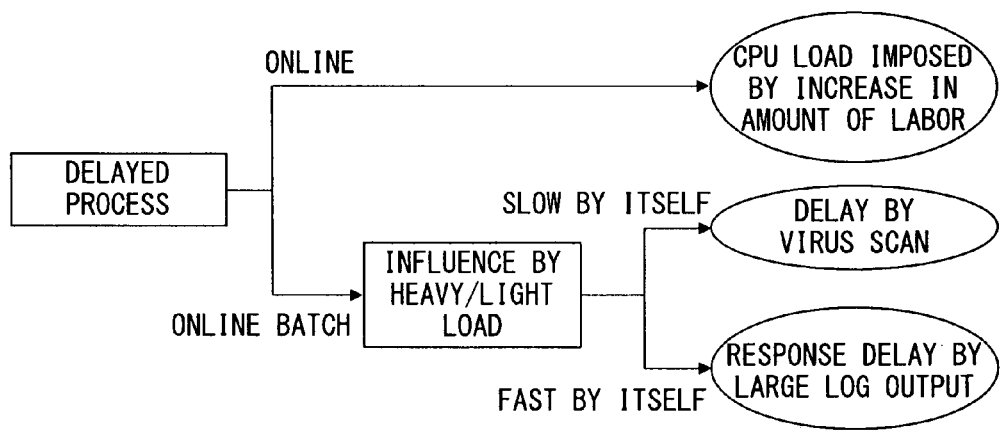
F I G. 3

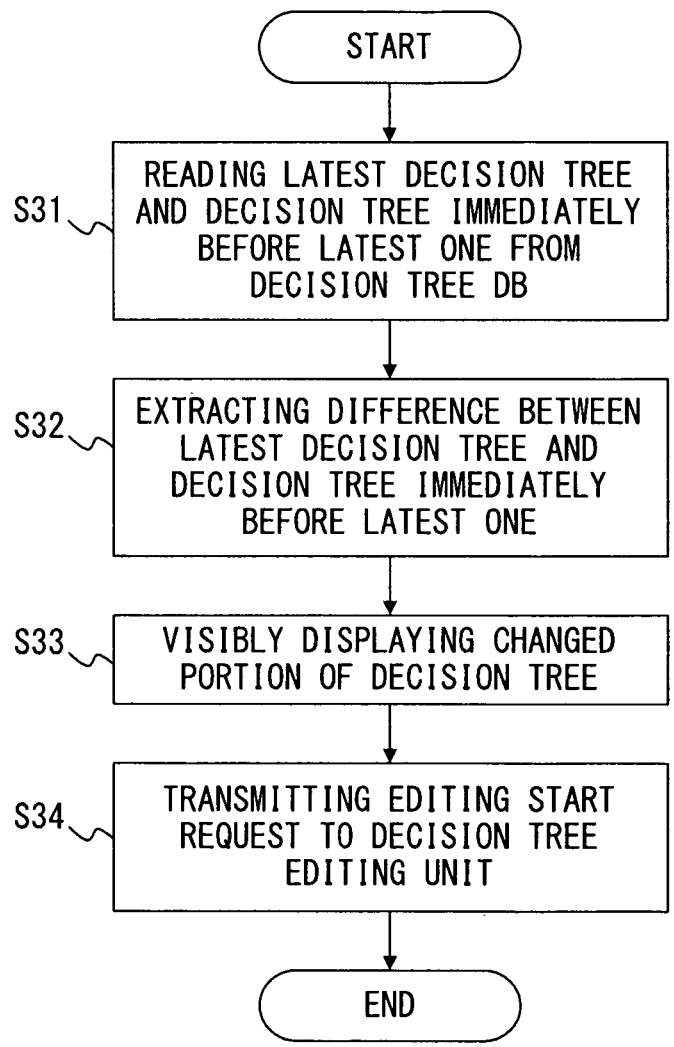
F I G. 1 1

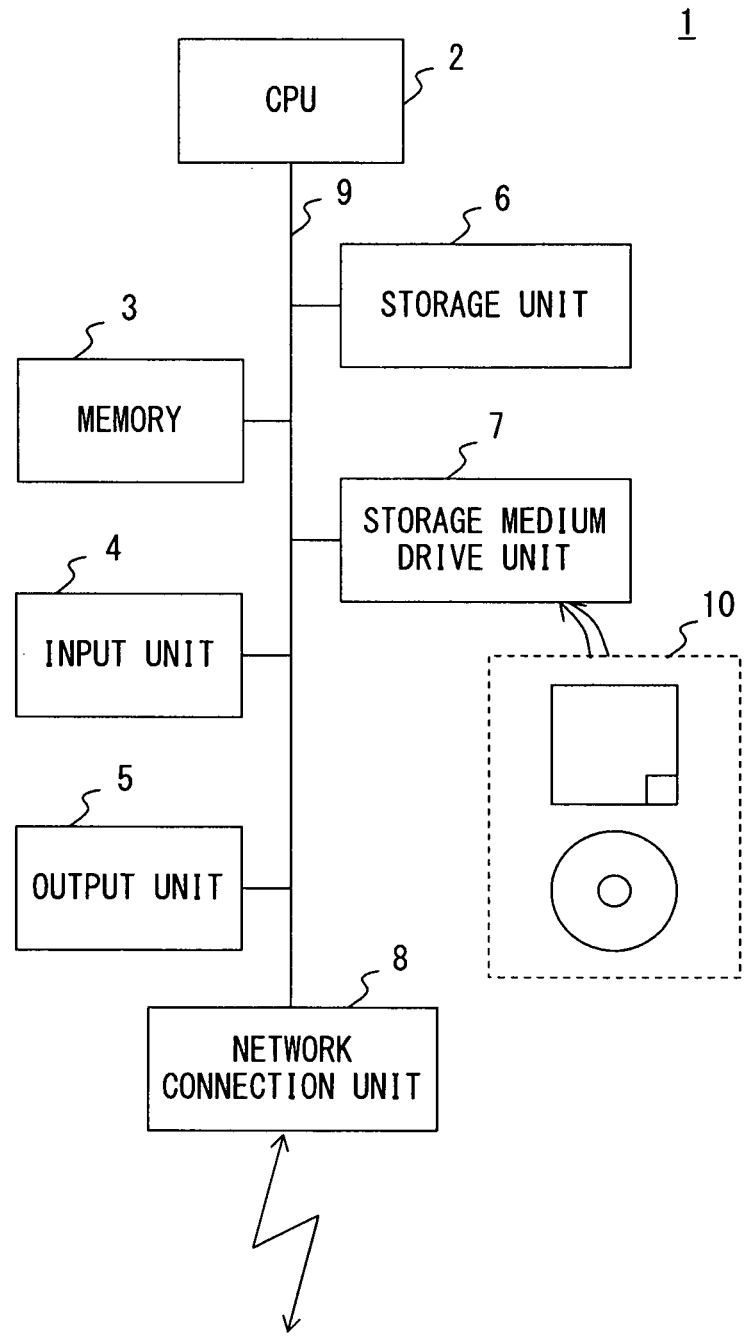
F I G. 16

RECORDING MEDIUM STORING DECISION TREE GENERATING PROGRAM, DECISION TREE GENERATING METHOD AND DECISION TREE GENERATING APPARATUS

CROSS-REFERENCE TO RELATED APPLICATIONS

This application is a continuation of PCT application PCT/JP2009/056488 which was filed on Mar. 30, 2009, the entire contents of which are incorporated herein by reference.

FIELD

The present invention relates to a decision tree generation technique for automatically generating a decision tree from a case set.

BACKGROUND

In fields such as a statistical decision theory, artificial intelligence, machine learning, data mining and the like, a decision tree is used for building of an expected model, decision-making analysis/optimization, resolution of a classification problem, description of concept/knowledge, rule extraction/generation and the like. The decision tree is represented with a tree diagram by hierarchizing repetitions of branches. As a technique for automatically generating a decision tree, a technique for automatically generating a decision tree based on, for example, an average amount of information (entropy) of each case in a case set.
Patent Document 1: Japanese Laid-open Patent Publication No. HEI9-330224

SUMMARY

The present invention aims at performing a recording medium storing decision tree generating program, a decision tree generating method and a decision tree generating apparatus.

According to an aspect of the invention, a non-transitory computer readable recording medium storing decision tree generating program for causing a computer having an external storage device storing a constraint condition that stipulates a structure of a decision tree to implement, a case inputting unit configured to read a case set where values of a plurality of attributes and a conclusion are associated with one another, and a decision tree generating unit configured to read the constraint condition from the external storage device, and to generate a decision tree from the case set read by the case inputting unit so that the structure of the decision tree, which is stipulated by the constraint condition, is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates one embodiment of a decision tree generating apparatus embodying the present technique;
FIG. 2 is an explanatory view of a case set held in a case DB;
FIG. 3 is an explanatory view of a decision tree, held in a modification history DB, before being edited;
FIG. 11 is a flowchart illustrating a difference display process executed by a difference displaying unit;
FIG. 16 is a configuration of an information processing device.

DESCRIPTION OF EMBODIMENTS

In the meantime, if new cases are added to a case set one after another, there is a possibility that a decision tree used so far does not suit the new cases. For this reason, a decision tree needs to be periodically regenerated from the case set. Moreover, it cannot be always said that a decision tree automatically generated with a conventionally proposed technique suits the case set. Therefore, an operator such as an administrator or the like needs to verify an automatically generated decision tree, and to suitably modify the decision tree if necessary. Moreover, contents modified by the operator are not reflected on the decision tree automatically generated from the case set to which the new cases have been added. Accordingly, the operator needs to again make the same modifications, leading to an increase in a labor time needed to modify the decision tree.

In light of such problems, the present invention aims at providing a decision tree automatic generation technique that reduces decision tree modification operations performed by an operator by automatically generating a decision tree from a case set with introduction of a constraint condition that stipulates a structure of the decision tree.

This decision tree generation technique newly introduces a constraint condition that stipulates a structure of a decision tree. Then, the decision tree is generated from the case set where values of a plurality of attributes and a conclusion are associated with one another so that the structure of the decision tree, which is stipulated by the constraint condition, is satisfied.

EFFECTS OF THE INVENTION

With this decision tree generation technique, for example, even if a new case is added to a case set, a basic structure of a decision tree is succeeded by a constraint condition, thereby avoiding a situation where an operator needs to significantly modify the decision tree. Accordingly, operations of modifying the decision tree, which are performed by the operator, can be reduced.

BEST MODE OF CARRYING OUT THE INVENTION

This technique is described in detail below with reference to the attached drawings.

FIG. 1 illustrates one embodiment of a decision tree generating apparatus embodying the present technique. An object of this decision tree generating apparatus in this embodiment is to generate a decision tree implemented by hierarchizing troubleshooting procedures of an information system. However, the present technique is not limited to this object.

Figure 4:
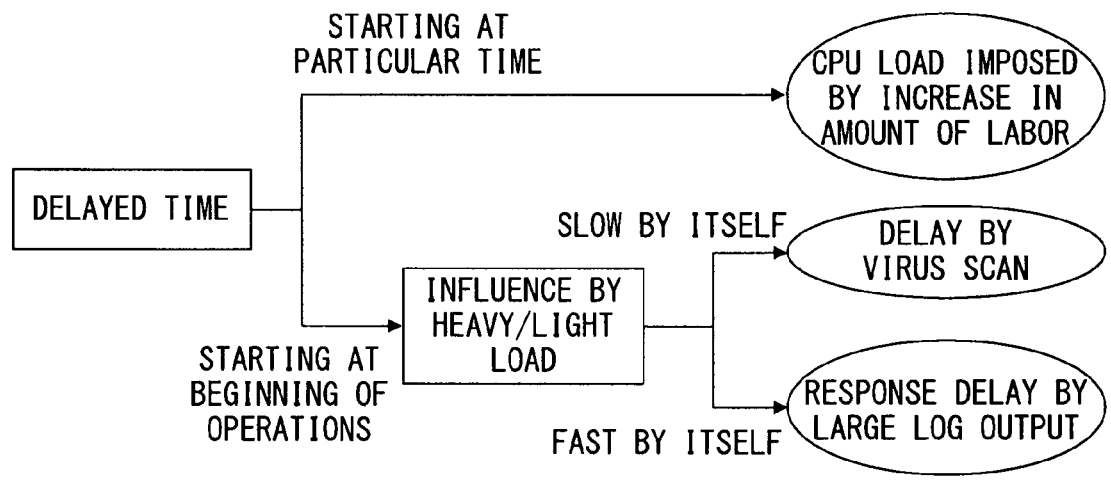
FIG. 4 is an explanatory view of a decision tree, held in the modification history DB, after being edited.

The decision tree generating apparatus 10 is configured by using a general-purpose computer having an external storage device such as a hard disk or the like. In the external storage device of the decision tree generating apparatus 10, a case DB (database) 12, a modification history DB 14, a decision tree DB 16 and a constraint condition DB 18 are respectively recorded. The case DB 12 holds, as a case set 12A regarding troubles of an information system, a set of records where values of attributes (branch conditions $a_1$ to $a_3$) of a decision tree and a cause (conclusion) are associated with one another respectively for cases (cases 1 to 4) as illustrated in FIG. 2. The modification history DB 14 holds a decision tree (FIG. 3) before being edited, and a decision tree (FIG. 4) after being edited as illustrated in FIGS. 3 and 4 as a modification history 14A of the decision tree edited by an operator. Not the decision trees themselves illustrated in FIGS. 3 and 4 but information that can identify a portion changed from the decision tree before being edited may be used as the modification history 14A of the decision tree. The decision tree DB 16 holds the latest decision tree automatically generated, a decision tree immediately before the latest one, and a decision tree modified or verified by an operator as various types of decision trees 16A. The constraint condition DB 18 holds each constraint condition 18A for stipulating a structure of the decision tree as follows.

Here, as one examples of the constraint condition 18, at least Ignore (A) stipulating that an attribute A is ignored, AcceptAfter (A, {B,C,D}) stipulating that the attribute A is subordinate to attributes B, C and D, and AcceptBefore (A, {B,C,D}) stipulating that the attribute A is superordinate to the attributes B, C and D are applied. The braces { } represent a set of attributes. Here, Ignore (A), AcceptAfter (A, {B,C, D}) and AcceptBefore (A, {B, C, D}) correspond to a first constraint condition, a second constraint condition and a third constraint condition, respectively.

Additionally, in the decision tree generating apparatus 10, a case inputting unit 20, a decision tree generating unit 22, a difference displaying unit 24, a decision tree editing unit 26, a decision tree outputting unit 28, a modification history storing unit 30, and a constraint condition generating unit 32 are respectively embodied by executing a decision tree generating program stored in the external storage device. In the external storage device of the decision tree generating apparatus 10, the decision tree generating program is installed from a computer-readable recording medium such as a CD-ROM or the like recording the decision tree generating program.

The case inputting unit 20 reads the case set 12A from the case DB 12. The decision tree generating unit 22 references the constraint condition 18A held in the constraint condition DB 18 to automatically generate a decision tree from the case set 12A read by the case inputting unit 20. The difference displaying unit 24 references the decision tree DB 16 to display a difference between the latest decision tree automatically generated by the decision tree generating unit 22 and a decision tree immediately before the latest one on a display device such as a monitor or the like. The decision tree editing unit 26 provides an editing function for suitably editing the decision tree automatically generated by the decision tree generating unit 22 in an interactive environment in collaboration with the display device and a pointing device such as a mouse or the like. As contents of editing a decision tree, a deletion, an addition, a move or the like of an attribute are assumed. The decision tree outputting unit 28 stores a decision tree 16A (including a decision tree 16A only verified) edited by the decision tree editing unit 26 in the decision tree DB 16. The modification history storing unit 30 stores a modification history 14A of the decision tree edited by the decision tree editing unit 26 in the modification history DB 14. The constraint condition generating unit 18 automatically generates the constraint condition 18A from the modification history 14A while referencing the modification history 14A held in the modification history DB 14, and stores the automatically generated constraint condition 18A in the constraint condition DB 18.

Here, the case inputting unit 20 respectively corresponds to a step of reading the case set, and case inputting means, and the decision tree generating unit 22 respectively corresponds to a step of generating a decision tree, and decision tree generating means. Moreover, the decision tree editing unit 26 respectively corresponds to a step of editing a decision tree, and decision tree editing means, and the constraint condition generating unit 32 respectively corresponds to a step of generating/storing a constraint condition, and constraint condition generating means.

Figure 5:
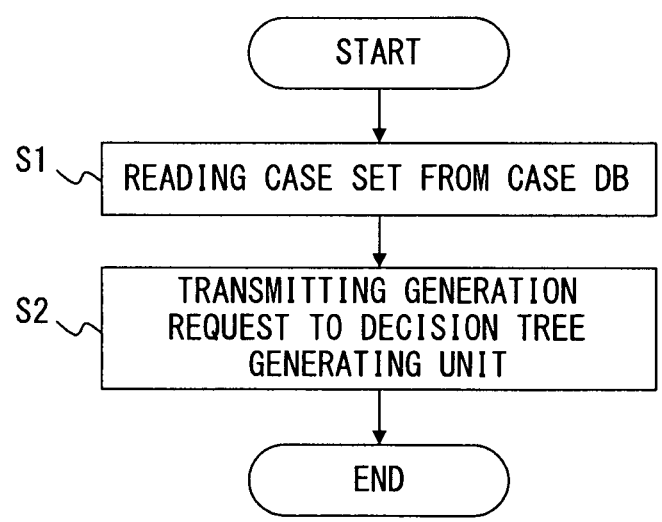
FIG. 5 is a flowchart illustrating a case input process executed by a case inputting unit.

FIG. 5 illustrates a case input process executed by the case inputting unit 20 at the timing when an operator issues a decision tree generation instruction.

In step 1 (abbreviated to S1 in the drawings. The same applies to the other steps hereinafter), the case inputting unit 20 reads the case set 12A from the case DB 12.

In step 2, the case inputting unit 20 transmits the decision tree generation request to the decision tree generating unit 22.

Figure 6:
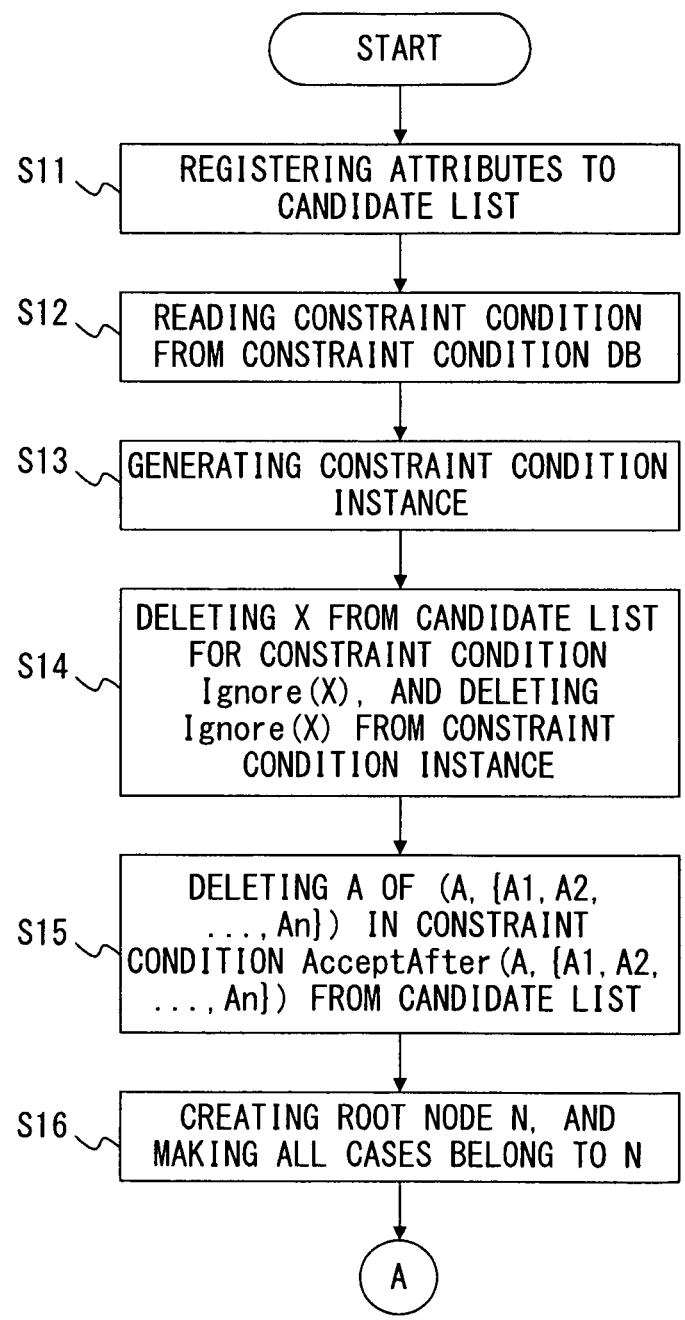
FIG. 6 is a flowchart illustrating a decision tree generation process executed by a decision tree generating unit.
Figure 7:
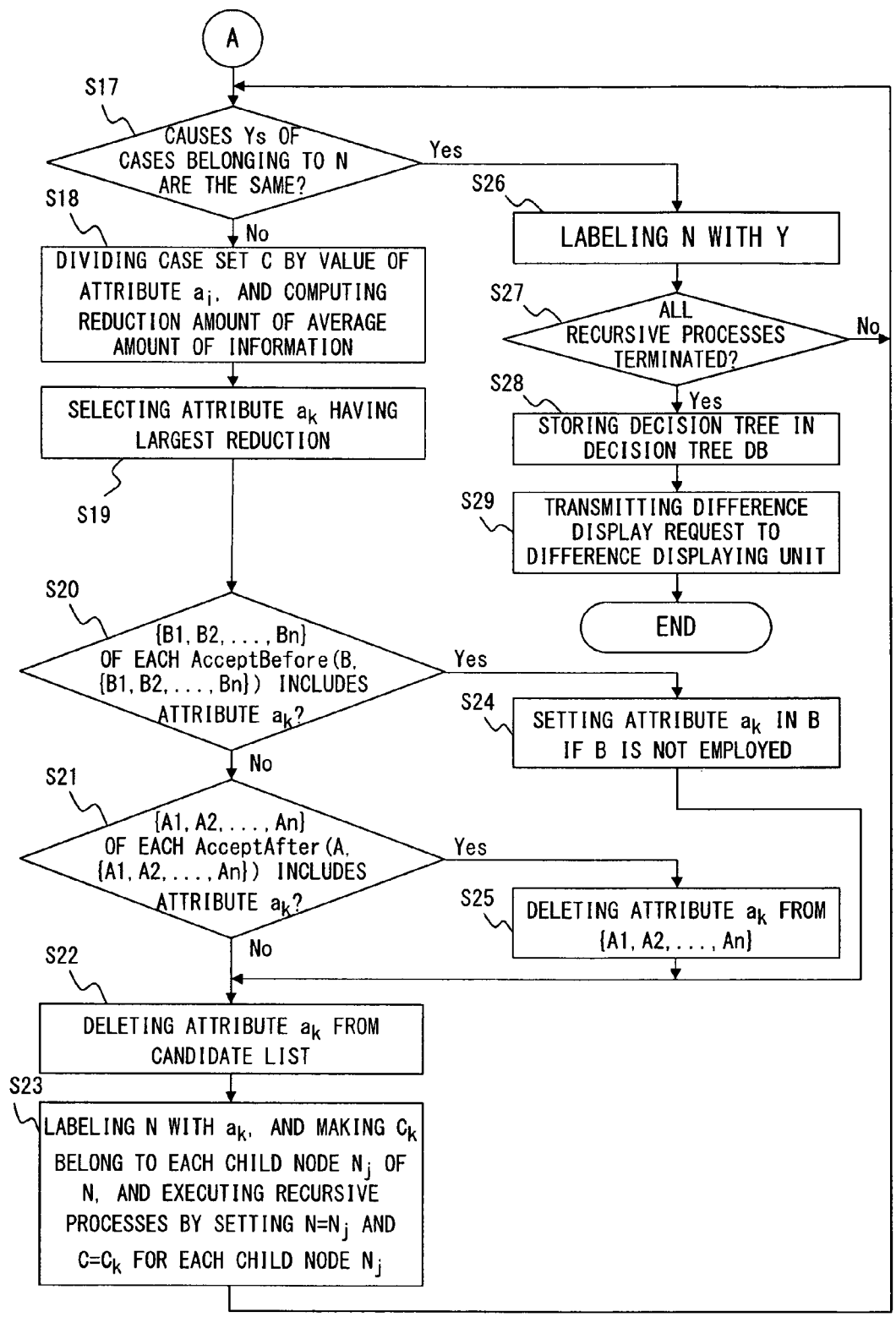
FIG. 7 is a flowchart illustrating the decision tree generation process executed by the decision tree generating unit.

FIGS. 6 and 7 illustrate a decision tree generation process executed by the decision tree generating unit 22 at the timing when the decision tree generation request is issued from the case inputting unit 20. Details of the decision tree generation process, see Quinlan, J. R "Induction of Decision Trees" Machine Learning, vol. 1, No. 1, pp 81-106 (1986) or the like, which explains known C4.5.

In step 11, the decision tree generating unit 22 extracts attributes from the case set 12A read by the case inputting unit 20, and registers all the attributes to a candidate list in a memory.

In step 12, the decision tree generating unit 22 reads a constraint condition 18A from the constraint condition DB 18.

In step 13, the decision tree generating unit 22 generates a constraint condition instance obtained by copying the constraint condition 18A in the memory.

In step 14, the decision tree generating unit 22 deletes an attribute X from the candidate list for the constraint condition Ignore (X) (X: attribute), and deletes Ignore (X) itself from the constraint condition instance. If the constraint condition Ignore (X) does not exist, no change is made to the candidate list and the constraint condition instance.

In step 15, the decision tree generating unit 22 deletes the attribute A of the constraint condition AcceptAfter (A, {A1, A2, ... An}) (A, A1, A2, ... An:attributes) from the candidate list. Note that no change is made to the candidate list if the constraint condition AcceptAfter (A, {A1, A2, ... An}) does not exist.

In step 16, the decision tree generating unit 22 creates a root node N, and makes all the cases belong to the root node N.

In step 17, the decision tree generating unit 22 determines whether or not causes Y of cases belonging to the root node N are the same. If the decision tree generating unit 22 determines that the causes Y of the cases are not the same ("NO" in step 17), the flow goes to step S18. If the decision tree generating unit 22 determines that the causes Y of the cases are the same ("YES" in step 17), the flow goes to step 26.

In step 18, the decision tree generating unit 22 computes a reduction amount of an average amount of information (entropy) that represents a deviation of a probability distribution by dividing a case set C by a value of an attribute $a_i$. An index such as a Gini index, an information gain or the like may be used as a replacement for the average amount of information.

In step 19, the decision tree generating unit 22 selects an attribute $a_k$ having the largest reduction amount of the average amount of information.

In step 20, the decision tree generating unit 22 determines whether or not an attribute set {B1, B2, ... , Bn} of each constraint condition AcceptBefore (B, {B1, B2, ... , Bn}) includes an attribute $a_k$. If the decision tree generating unit 22 determines that the attribute set (B, {B1, B2, ... , Bn}) does not include the attribute $a_k$ ("NO" in step 20), the flow goes to step S21. Alternatively, if the decision tree generating unit determines that the attribute set (B, {B1, B2, ... , Bn}) includes the attribute $a_k$ ("YES" in step 20), the flow goes to step S24.

In step 21, the decision tree generating unit 22 determines whether or not an attribute set (A, {A1, A2, ... , An}) of each constraint condition AcceptAfter (A, {A1, A2, ... , An}) includes the attribute $a_k$. If the decision tree generating unit 22 determines that the attribute set (A, {A1, A2, ... , An}) does not include the attribute $a_k$ ("NO" in step 21), the flow goes to step 22. Alternatively, if the decision tree generating unit determines that the attribute set (A, {A1, A2, ... , An}) includes the attribute $a_k$ ("YES" in step 21), the flow goes to step 25.

In step 22, the decision tree generating unit 22 deletes the attribute $a_k$ from the candidate list.

In step 23, the decision tree generating unit 22 creates a child node $N_j$ of the root node N by labeling the root node N with the attribute $a_k$, and makes a case $C_k$ belong to each child node $N_j$. Thereafter, the flow goes back to step 17 so that the decision tree generating unit 22 recursively executes the processes in and after step S17 by setting the root node N=child nod $N_j$, and the case set C=case $C_k$ for each child node $N_j$.

In step 24, the decision tree generating unit 22 sets the attribute $a_k$ for an attribute B if the attribute B of the constraint condition AcceptBefore(B, {B1, B2, ... , Bn}) is not employed.

In step 25, the decision tree generating unit 22 deletes the attribute $a_k$ from the attribute set (A, {A1,A2,...,An}) of the constraint condition AcceptAfter (A, {A1, A2, ... , An}). Then, the flow goes to step 22. If the attribute set is emptied, the decision tree generating unit 22 adds the attribute A to the candidate list, and deletes the constraint condition AcceptAfter( ) from the constraint condition instance.

In step 26, the decision tree generating unit 22 labels the root node with the cause Y.

In step 27, the decision tree generating unit 22 determines whether or not all the recursive processes have been terminated. If the decision tree generating unit 22 determines that all the recursive processes have been terminated ("YES" in step S27), the flow goes to step 28. Alternatively, if the decision tree generating unit 22 determines that all the recursive processes have not been terminated yet ("NO" in step S27), the flow goes back to step 17.

In step 28, the decision tree generating unit 22 stores the decision tree automatically generated with the processes of step 11 to step 27 in the decision tree DB 16.

In step 29, the decision tree generating unit 22 transmits a decision tree difference display request to the difference displaying unit 24.

Here, a process executed until a decision tree is generated from the case set of FIG. 2 is described to ease the understanding of the decision tree generation process. Assume that Ignore (delayed process), and AcceptBefore (delayed time, {influence by heavy/light load}) are stored as the constraint conditions 18A for stipulating the structure of the decision tree illustrated in FIG. 4.

Once the decision tree generation process starts to be executed, "delayed process", "delayed time" and "influence by heavy/light load are respectively registered to the candidate list. Moreover, the constraint conditions 18A are read from the constraint condition DB 18, and constraint condition instances obtained by copying the constraint conditions, namely, Ignore (delayed process), and AcceptBefore (delayed time, {influence by heavy/light load}) are generated. When the constraint condition instances have been generated, the constraint condition Ignore (delayed process) exists in the constraint condition instance. Therefore, "delayed process" is deleted from the candidate list, and at the same time, Ignore (delayed process) is deleted from the constraint condition instance. As a result, "delayed time" and "influence by heavy/ light load" are registered to the candidate list, whereas AcceptBefore (delayed time, {influence by heavy/light load}) is held in the constraint condition instance. Since the constraint condition AcceptAfter (A, {A1, A2, ..., An}) does not exist in the constraint condition instance, the root node N is created, and the cases 1 to 4 are made to belong to the root node N (N={case 1, case 2, case 3, case 4}).

Figure 8:
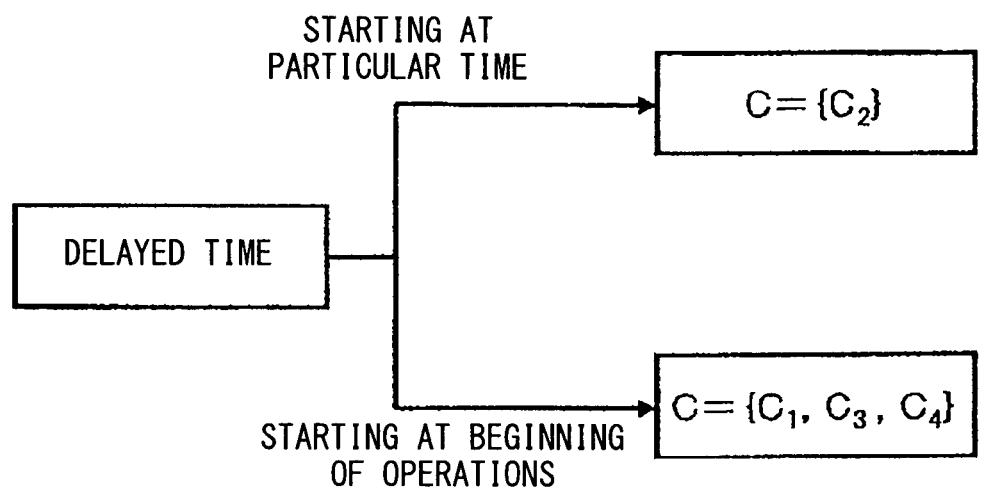
FIG. 8 is an explanatory view of an initially generated decision tree in a process executed until a decision tree is generated from a particular case set.

Because the causes of the cases 1 to 4 belonging to the root node N are not the same, the cases are divided by "delayed time" and "influence by heavy/light load", which are registered to the candidate list, and a reduction amount of the average amount of information for each of the cases is computed. Since the reduction amount of the average amount of information for "delayed time" is larger than that of "influence by heavy/light load", "delayed time" is selected as the attribute $a_k$. Moreover, the attribute set {influence by heavy/ light load} of the constraint condition instance AcceptBefore (delayed time, {influence by heavy/light load}) does not include "delayed time", and the constraint condition instance does not hold AcceptAfter( ). Therefore, "delayed time" is deleted from the candidate list. As a result, only "influence by heavy/light load" is registered to the candidate list. Then, as illustrated in FIG. 8, the root node N is labeled with "delayed time", and the case set $C_k$ matching a branch condition is made to belong respectively to two child nodes $N_j$ according to the number of branch conditions. Thereafter, the recursive processes are executed by setting the root node N=$N_j$, and the case set C=$C_k$ for each of the child nodes $N_j$.

Figure 9:
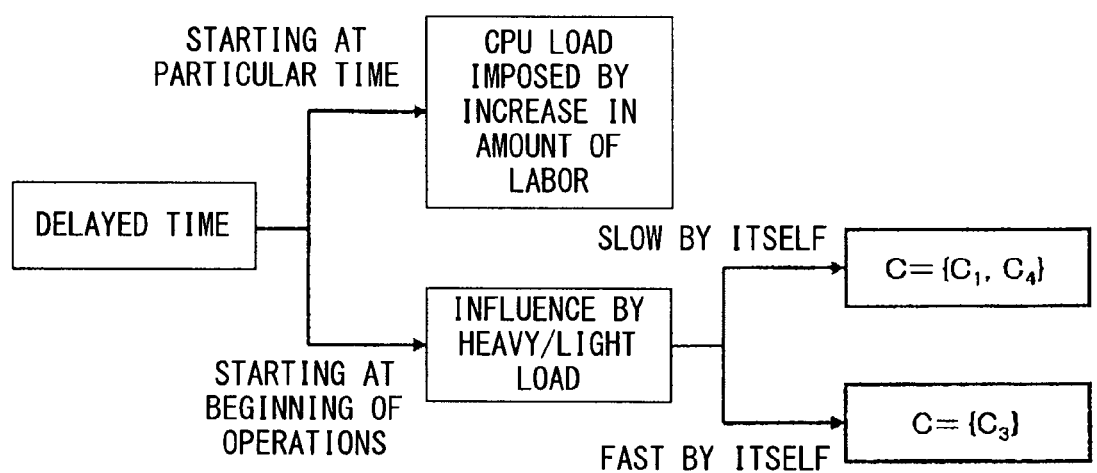
FIG. 9 is an explanatory view of a decision tree generated midway in the process executed until the decision tree is generated from the particular case set.

If the delayed time starts at a particular time, the root node N={case 2}, and all of its causes Y (CPU load imposed by an increase in the amount of labor" are the same. Therefore, the root node N is labeled with "CPU load imposed by an increase in the amount of labor". In contrast, if the delayed time starts at the beginning of operations, the root node N={case 1, case 3, case 4}, and all of their causes Y are not the same. Accordingly, the case 1, the case 3 and the case 4, which belong to the root node N, are respectively divided by "influence by heavy/light load" registered to the candidate list, and a reduction amount of the average amount of information of each of the cases is computed. Because an attribute having the largest reduction amount of the average amount of information is "influence by heavy/light load", "influence by heavy/light load" is selected as the attribute $a_k$. Moreover, the attribute set {influence by heavy/light load} of the constraint condition instance AcceptBefore (delayed time, {influence by heavy/light load}) includes "influence by heavy/light load". Since this is employed, the constraint condition instance is not changed, and "influence by heavy/light load" is deleted from the candidate list. As a result, the candidate list is emptied. Then, as illustrated in FIG. 9, the root node N is labeled with "influence by heavy/light load", and a case set $C_k$ matching a branch condition is made to belong respectively to two child nodes $N_j$ according to the number of branch conditions. Thereafter, the recursive processes are executed by setting the root node $N=N_j$, and the case set $C=C_k$ for each of the child nodes $N_j$.

Figure 10:
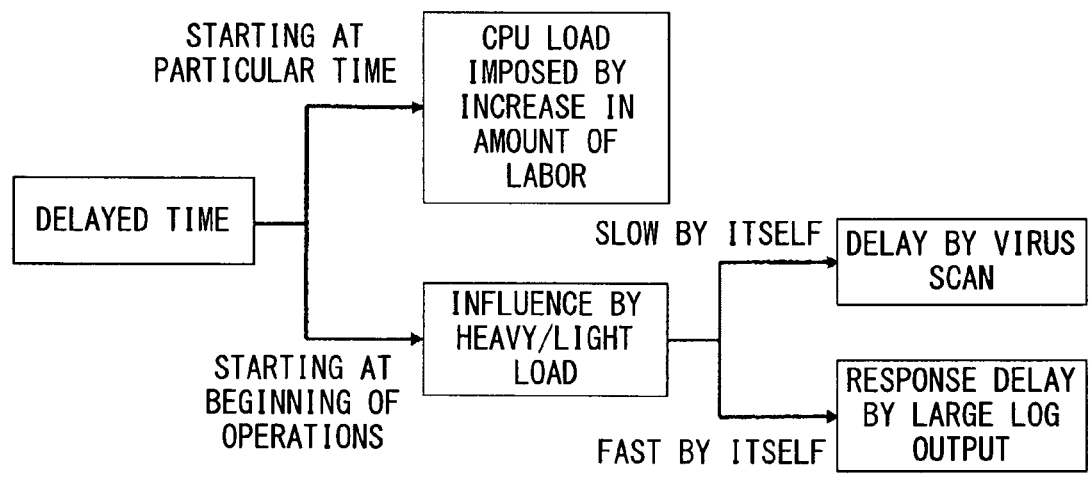
FIG. 10 is an explanatory view of a finally generated decision tree in the process executed until the decision tree is generated from the particular case set.

If "influence by heavy/light load" is slow by itself, the root node N={case 1, case 4}, and all of their causes Y (delay by virus scan) are the same. Therefore, the root node N is labeled with "delay by virus scan". In contrast, if "influence by heavy/light load" is fast by itself, the root node N={case 3}, and all of its causes Y (response delay by a large log output) are the same. Therefore, the root node N is labeled with "response delay by a large log output". Then, all the recursive processes have been terminated, so that a decision tree illustrated in FIG. 10 is generated.

FIG. 11 illustrates a difference display process executed by the difference displaying unit 24 at the timing when the decision tree generating unit 22 issues a difference display request.

In step 31, the difference displaying unit 24 reads the latest decision tree and a decision tree immediately before the latest one from the decision tree DB 16.

In step 32, the difference displaying unit 24 extracts a difference between the latest decision tree and the decision tree immediately before the latest one.

In step 33, the difference displaying unit 24 visibly displays the changed portion of the decision tree, which is identified with the difference. Here, "visibly displayed" means that the changed portion is output to the display device such as a monitor or the like so that an operator can view the changed portion.

In step 34, the difference displaying unit 24 issues a decision tree editing start request to the decision tree editing unit 26. Note that the editing start request is transmitted to the decision tree editing unit 26 when the operator instructs the difference display to be terminated.

Figure 12:
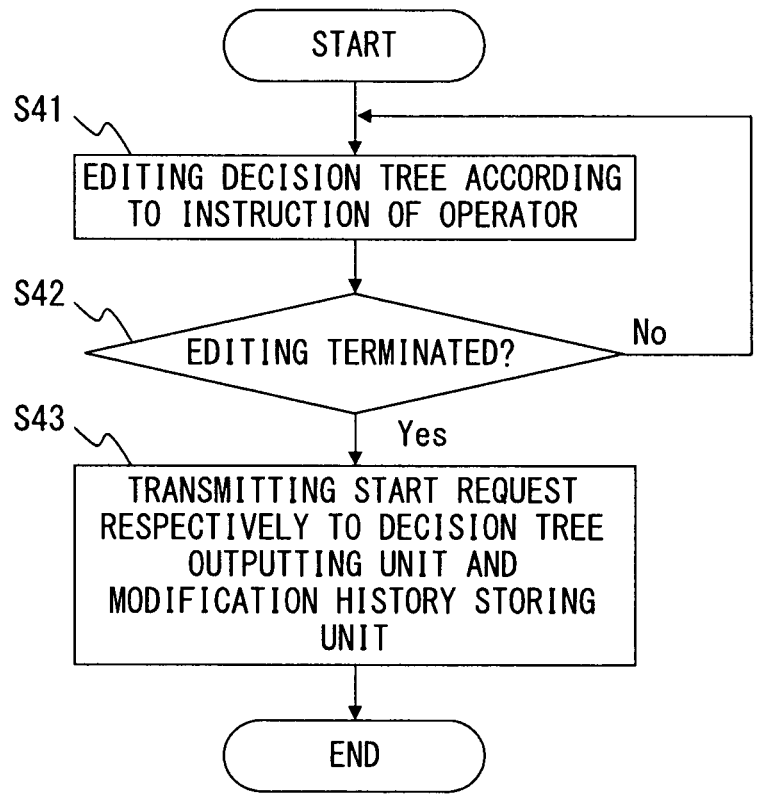
FIG. 12 is a flowchart illustrating a decision tree editing process executed by a decision tree editing unit.

FIG. 12 illustrates a decision tree editing process executed by the decision tree editing unit 26 at the timing when the difference displaying unit 24 issues the editing start request.

In step 41, the decision tree editing unit 26 suitably edits a decision tree generated by the decision tree generating unit 22 according to an instruction of the operator.

In step 42, the decision tree editing unit 26 determines whether or not to terminate the editing process, for example by judging whether or not the operator has issued an editing termination instruction. If the decision tree editing unit 26 determines to terminate the editing process ("YES" in step S42), the flow goes to step S43. Alternatively, if the decision tree editing unit 26 determines not to terminate the editing process ("NO" in step S42), the flow goes back to step S41.

In step 43, the decision tree editing unit 26 transmits a start request to notify the start of each of the processes respectively to the decision tree outputting unit 28 and the modification history storing unit 30.

Figure 13:
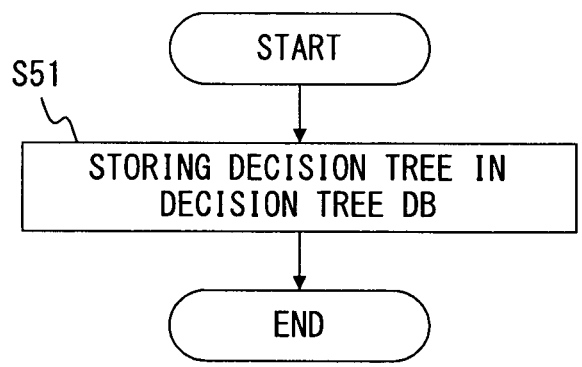
FIG. 13 is a flowchart illustrating a decision tree output process executed by a decision tree outputting unit.

FIG. 13 illustrates a decision tree output process executed by the decision tree outputting unit 28 at the timing when the decision tree editing unit 26 issues the start request.

In step 51, the decision tree outputting unit 28 stores a decision tree edited by the decision tree editing unit 26 in the decision tree DB 16.

Figure 14:
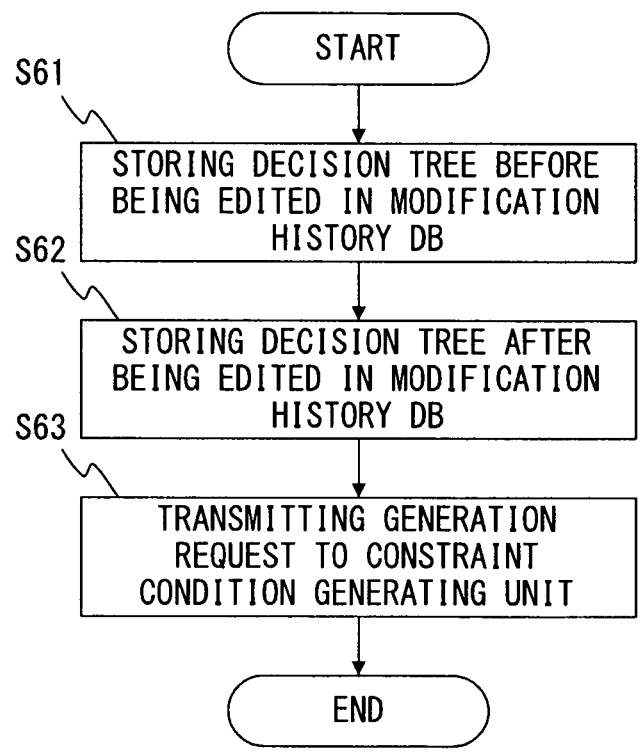
FIG. 14 is a flowchart illustrating a modification history storage process executed by a modification history storing unit.

FIG. 14 illustrates a modification history storage process executed by the modification history storing unit 30 at the timing when the decision tree editing unit 26 issues the start request.

In step 61, the modification history storing unit 30 stores the decision tree before being edited by the decision tree editing unit 26 in the modification history DB 14. A decision tree after being edited, which is stored in the modification history DB 14, may be used as a replacement for the decision tree before being edited.

In step 62, the modification history storing unit 30 stores the decision tree after being edited by the decision tree editing unit 26 in the modification history DB 14.

In step 63, the modification history storing unit 30 transmits a constraint condition generation request to the constraint condition generating unit 32.

Figure 15:
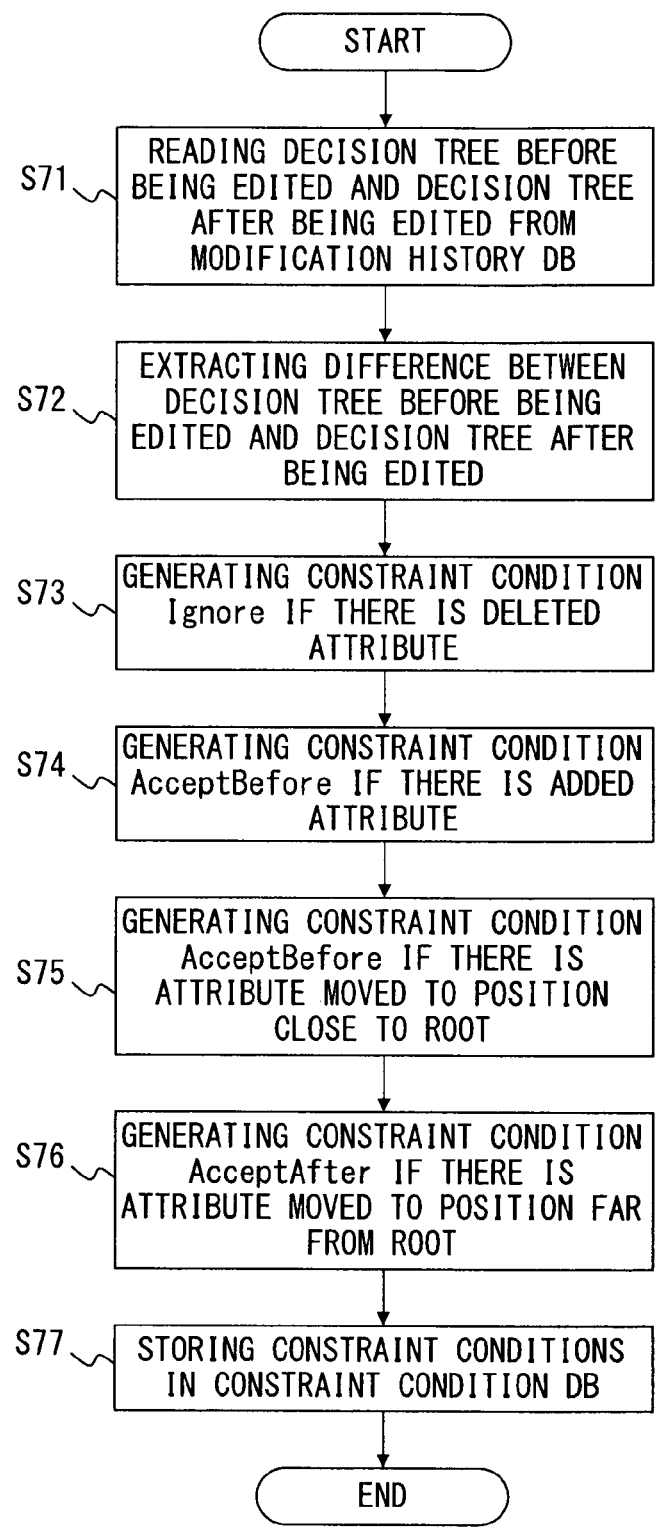
FIG. 15 is a flowchart illustrating a constraint condition generation process executed by a constraint condition generating unit.

FIG. 15 illustrates a constraint condition generation process executed by the constraint condition generating unit 32 at the timing when the modification history storing unit 30 issues the generation request.

In step 71, the constraint condition generating unit 32 reads the decision tree before being edited and the decision tree after being edited respectively from the modification history DB 14.

In step 72, the constraint condition generating unit 32 extracts a difference between the decision tree before being edited and the decision tree after being edited. Here, as the difference between the decision tree before being edited and the decision tree after being edited, an attribute deleted from the decision tree before being edited, an attribute added to the decision tree before being edited, an attribute moved to a position close to the root, or an attribute moved to a position far from the root is extracted.

In step 73, if there is an attributed deleted from the decision tree before being edited, the constraint condition generating unit 32 generates a constraint condition Ignore (deleted attribute).

In step 74, if there is an attribute added to the decision tree before being edited, the constraint condition generating unit 32 generates a constraint condition AcceptBefore (added attribute, {a set of attributes subordinate to the added attribute}).

In step 75, if there is an attribute moved to a position close to the root in the decision tree before being edited, the constraint condition generating unit 32 generates a constraint condition AcceptBefore (moved attribute, {set of attributes subordinate to the moved attribute}).

In step 76, if there is an attributed moved to a position far from the root in the decision tree before being edited, the constraint condition generating unit 32 generates a constraint condition AcceptAfter (moved attribute, {set of attributes superordinate to the moved attribute}).

In step 77, the constraint condition generating unit 32 stores the constraint conditions generated in step 73 to step 76 in the constraint condition DB 18.

Here, a process executed until a constraint condition is generated from the decision trees before and after being edited, which are illustrated in FIGS. 4 and 3, is described to ease the understanding of the constraint condition generation process.

Once the constraint condition generation process starts to be executed, the decision tree (FIG. 3) before being edited and the decision tree (FIG. 4) after being edited are respectively read from the modification history DB 14. Moreover, a deletion of "delayed process", and an addition of "delayed time" prior to "influence by heavy/light load" are extracted as differences between the decision trees. Since "delay reason" is deleted, a constraint condition Ignore (delay reason) is generated. In the meantime, since "delayed time" is added prior to "influence by heavy/light load", a constraint condition AcceptBefore (delayed time, {influence by heavy/light load}) is generated. These conditions are stored in the constraint condition DB 18 thereafter.

With such a decision tree generating apparatus 10, a constraint condition 18A that stipulates a structure of a decision tree is generated from the decision tree modification history DB 14A by an operator. Then, a decision tree is generated from the case set 12A so that the structure of the decision tree, which is stipulated by the constraint condition 18A, is satisfied. Accordingly, a basic structure of the decision tree is succeeded even if a new case is added to the case set 12A. This can avoid a situation where an operator needs to significantly modify the decision tree. Accordingly, operations of modifying the decision tree by the operator can be reduced.

At this time, the constraint condition 18A that stipulates the structure of the decision tree is automatically generated from the decision tree modification history DB 14A, leading to saving of labor needed to create the decision tree. Moreover, the constraint condition 18A that stipulates the structure of a decision tree is represented with at least Ignore(A), AcceptAfter(A, {B,C,D}) and AcceptBefore(A, {B,C,D}), whereby a control can be prevented from becoming complicated. Additionally, the second argument is represented with a set in AcceptAfter(A, {B,C,D}) and AcceptBefore(A, {B,C,D}). Therefore, even if a decision tree is complicated, a structure of the decision tree can be stipulated. Furthermore, a difference between the latest decision tree and a decision tree immediately before the latest one is displayed on a display device before the decision tree starts to be edited. Therefore, an operator can easily learn where to modify the decision tree.

Note that the constraint condition 18A that stipulates the structure of a decision tree may be created by an operator who edits the decision tree and may be stored in the constraint condition DB 18. In this case, the modification history DB 14, the modification history storing unit 30 and the constraint condition generating unit 32 are not necessary. Moreover, it is not always needed to include the difference displaying unit 24. Furthermore, the case DB 12 and the decision tree DB 16 may be recorded in an external storage device outside the decision tree generating apparatus 10.

The above-described decision tree generating apparatus may be constituted, for example, using an information processing device (computer) as illustrated in FIG. 16.

An information processing device 1 includes a CPU (central processing unit) 2, memory 3, an input unit 4, an output unit 5, a storage unit 6, a storage medium drive unit 7, and a network connection unit 8, which are coupled to each other by a bus 9.

The CPU controls the entire information processing device 1.

The memory 3 is ROM (read-only memory), RAM (random-access memory) or the like, for temporarily storing a program or data that are stored in the storage unit 6 (or a portable storage medium 10) when a program is executed. The CPU 2 performs the above-described various processes by executing a program using the memory 3.

In this case, a program code itself read from the portable storage medium 10 or the like realizes the new functions of the present invention and a storage medium or the like on which the program code is recorded constitutes the present invention.

The input unit 4 is, for example, a keyboard, a mouse, a touch panel, or the like.

The output unit 5 is, for example, a display, a printer or the like.

The storage unit 6 is, for example, a magnetic disk device, an optical disk device, a tape device, or the like. The information processing device 1 stores the above program and data in the storage unit 6, and if requested, reads them into the memory 3 and uses them.

The storage medium drive unit 7 drives the portable storage medium 10 and accesses its recorded content.

For the portable storage medium, a memory card, an arbitrary computer-readable non-transitory storage medium such as a flexible disk, a CD-ROM (compact disk read-only memory), an optical disk, a magneto-optical disk, or the like is used. A user stores the above program and data in this portable storage medium 10, and reads them into the memory 3 and use them as requested.

The network connection unit 8 is coupled to an arbitrary communication network such as a LAN (local area network) or the like and exchanges data accompanying communications.

The present invention is not limited to the above-described preferred embodiments and may take various configurations or shapes as long as they do not depart from the spirit and scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable medium storing decision tree generating program for causing a computer having an external storage device storing a constraint condition that stipulates a structure of a decision tree to execute a procedure, the procedure comprising:
   reading a case set where values of a plurality of attributes and a conclusion are associated with one another;
   reading the constraint condition from the external storage device;
   generating a decision tree from the case set read so that the structure of the decision tree, which is stipulated by the constraint condition, is satisfied;
   editing the decision tree generated;
   generating the constraint condition from a modification history of the decision tree edited; and
   storing the constraint condition in the external storage device, wherein
   the constraint condition is composed of at least a first constraint condition stipulating an ignored attribute, a second constraint condition stipulating that an attribute is subordinate to other attributes, and a third constraint condition stipulating that an attribute is superordinate to other attributes, and the generating the constraint condition comprises generating the first constraint condition that ignores an attribute if the attribute is deleted from the decision tree, generating the second constraint condition stipulating that an attribute is subordinate to attributes other than the attribute if the attribute is moved to a position further from a root of the decision tree, and generating the third constraint condition stipulating that an attribute is superordinate to attributes other than the attribute if the attribute is added to the decision tree or if the attribute is moved to a position closer to the root of the decision tree.

2. The medium according to claim 1, wherein the other attributes in the second constraint condition and the third constraint condition are respectively represented with a set.

3. The medium according to claim 1, further comprising:

extracting a difference between a latest decision tree generated and a decision tree immediately before the latest decision tree; and displaying the difference on a display device.

4. A decision tree generating method for causing a computer having an external storage device storing a constraint condition that stipulates a structure of a decision tree to execute, the method comprising:

reading a case set where values of a plurality of attributes and a conclusion are associated with one another;

reading the constraint condition from the external storage device;

generating a decision tree from the read case set so that the structure of the decision tree, which is stipulated by the constraint condition, is satisfied;

editing the generated decision tree according to an instruction of an operator;

generating the constraint condition from a modification history of the decision tree edited; and storing the constraint condition in the external storage device, wherein the constraint condition is composed of at least a first constraint condition stipulating an ignored attribute, a second constraint condition stipulating that an attribute is subordinate to other attributes, and a third constraint condition stipulating that an attribute is superordinate to other attributes, and the generating the constraint condition comprises generating the first constraint condition that ignores an attribute if the attribute is deleted from the decision tree, generating the second constraint condition stipulating that an attribute is subordinate to attributes other than the attribute if the attribute is moved to a position further from a root of the decision tree, and generating the third constraint condition stipulating that an attribute is superordinate to attributes other than the attribute if the attribute is added to the decision tree or if the attribute is moved to a position closer to the root of the decision tree.

5. A decision tree generating apparatus comprising:

a processor; and an external memory storing a constraint condition that stipulates a structure of a decision tree;

wherein the external memory operatively coupled to the processor, the processor configured to execute a process including:

reading a case set where values of a plurality of attributes and a conclusion are associated with one another;

reading the constraint condition from the external storage device;

generating a decision tree from the case set read by the case reading so that the structure of the decision tree, which is stipulated by the constraint condition, is satisfied;

editing the decision tree generated by the generating decision tree according to an instruction of an operator;

generating a constraint condition from a modification history of the decision tree edited by the editing decision tree editing; and storing the constraint condition in the external storage device, wherein the constraint condition is composed of at least a first constraint condition stipulating an ignored attribute, a second constraint condition stipulating that an attribute is subordinate to other attributes, and a third constraint condition stipulating that an attribute is superordinate to other attributes, and the generating the constraint condition comprises generating the first constraint condition that ignores an attribute if the attribute is deleted from the decision tree, generating the second constraint condition stipulating that an attribute is subordinate to attributes other than the attribute if the attribute is moved to a position further from a root of the decision tree, and generating the third constraint condition stipulating that an attribute is superordinate to attributes other than the attribute if the attribute is added to the decision tree or if the attribute is moved to a position closer to the root of the decision tree.

* * * * *